US011199127B2

(12) United States Patent
Fritz et al.

(10) Patent No.: US 11,199,127 B2
(45) Date of Patent: Dec. 14, 2021

(54) RECIPROCATING ENGINE SYSTEM WITH ELECTRICALLY DRIVEN COMPRESSOR AND METHOD FOR OPERATING SAME

(71) Applicant: AI ALPINE US BIDCO INC, Wilmington, DE (US)

(72) Inventors: Jassin Marcel Fritz, Muenchu (DE); Hang Lu, Freising (DE)

(73) Assignee: AI ALPINE US BIDCO INC, Wilmington, DE (US)

( * ) Notice: Subject to any disclaimer, the term of this patent is extended or adjusted under 35 U.S.C. 154(b) by 0 days.

(21) Appl. No.: 16/961,236

(22) PCT Filed: Jan. 11, 2018

(86) PCT No.: PCT/US2018/013250
§ 371 (c)(1),
(2) Date: Jul. 9, 2020

(87) PCT Pub. No.: WO2019/139585
PCT Pub. Date: Jul. 18, 2019

(65) Prior Publication Data
US 2021/0062711 A1 Mar. 4, 2021

(51) Int. Cl.
*F02B 33/40* (2006.01)
*F02B 37/04* (2006.01)
(Continued)

(52) U.S. Cl.
CPC .............. *F02B 33/40* (2013.01); *F02B 37/04* (2013.01); *F02B 37/16* (2013.01); *F02B 39/10* (2013.01); *F02D 41/0007* (2013.01)

(58) Field of Classification Search
CPC .......... F02B 33/40; F02B 37/04; F02B 37/16; F02B 39/10; F02B 37/162; F02B 33/34;
(Continued)

(56) References Cited

U.S. PATENT DOCUMENTS

2006/0021606 A1* 2/2006 Bryant .................... F02B 33/38
123/562
2008/0121218 A1 5/2008 Algrain
(Continued)

FOREIGN PATENT DOCUMENTS

EP 0938625 A1 9/1999
EP 2696052 A1 2/2014
(Continued)

OTHER PUBLICATIONS

PCT International Search Report and Written Opinion; Application No. PCT/US2018/013250; dated Mar. 19, 2018, 12 pages.

*Primary Examiner* — Audrey B. Walter
*Assistant Examiner* — Edward Bushard
(74) *Attorney, Agent, or Firm* — Fletcher Yoder, P.C.

(57) ABSTRACT

A reciprocating engine system includes a turbocharger system including a mechanically driven compressor, an electrically driven compressor, and a compressor bypass valve. A control system is programmed for generating control signals for: under nominal full load operating conditions, minimizing gas flow through the compressor bypass valve and compressing gas within the electrically driven compressor to maintain a speed set point or a full load power set point of the reciprocating engine system, under off nominal full load operating conditions wherein an efficiency of the mechanically driven compressor is reduced, compressing gas within the electrically driven compressor to compensate for the reduced efficiency of the mechanically driven compressor and to maintain the speed set point or the full load power set point of the reciprocating engine system, and under partial load operating conditions, partially diverting the gas flow through the compressor bypass valve in response to the reduced load.

19 Claims, 14 Drawing Sheets

(51) Int. Cl.
  *F02B 37/16* (2006.01)
  *F02B 39/10* (2006.01)
  *F02D 41/00* (2006.01)

(58) Field of Classification Search
  CPC ............. F02D 41/0007; F02D 2200/10; F02D 2200/602; Y02T 10/12
  See application file for complete search history.

(56) References Cited

U.S. PATENT DOCUMENTS

| | | | |
|---|---|---|---|
| 2014/0013742 A1 | | 1/2014 | Mizuno et al. |
| 2016/0076438 A1 | | 3/2016 | Tabata et al. |
| 2017/0335755 A1 | * | 11/2017 | Xiao ................. F02B 37/18 |
| 2018/0051641 A1 | | 2/2018 | Wilding |

FOREIGN PATENT DOCUMENTS

| | | | |
|---|---|---|---|
| EP | 3222835 | B1 | 9/2017 |
| FR | 2885388 | A1 | 11/2006 |

* cited by examiner

RECIPROCATING ENGINE SYSTEM WITH ELECTRICALLY DRIVEN COMPRESSOR AND METHOD FOR OPERATING SAME

CROSS-REFERENCE TO RELATED APPLICATION

This application is a National Stage entry from, and claims benefit of, PCT Application No. PCT/US2018/013250, filed on Jan. 11, 2018; entitled "Reciprocating Engine System with Electrically Driven Compressor and Method For Operating Same", which is herein incorporated by reference in its entirety.

BACKGROUND

The subject matter disclosed herein relates to reciprocating internal combustion engines and methods for operating reciprocating internal combustion engines.

A traditional reciprocating internal combustion engine uses four strokes, of which two can be considered high-power: the compression stroke (high power flow from crankshaft to the charge) and power stroke (high power flow from the combustion gases to crankshaft).

The Miller cycle is a thermodynamic cycle used in a type of internal combustion engine. The Miller cycle was patented by Ralph Miller, an American engineer, U.S. Pat. No. 2,817,322 dated Dec. 24, 1957. The engine may be two- or four-stroke and may be run on diesel fuel, gases, or dual fuel.

In the Miller cycle, the intake valve is left open longer than it would be in an Otto-cycle engine. In effect, the compression stroke is two discrete cycles: the initial portion when the intake valve is open and final portion when the intake valve is closed. This two-stage intake stroke creates the so-called "fifth" stroke that the Miller cycle introduces. As the piston initially moves upwards in what is traditionally the compression stroke, the charge is partially expelled back out through the still-open intake valve. Typically, this loss of charge air would result in a loss of power. However, in the Miller cycle, this is compensated for by the use of a supercharger. The supercharger typically will need to be of the positive-displacement (Roots or screw) type due to its ability to produce boost at relatively low engine speeds. Otherwise, low-rpm power will suffer.

In the Miller-cycle engine, the piston begins to compress the fuel-air mixture only after the intake valve closes; and the intake valve closes after the piston has traveled a certain distance above its bottom-most position: around 20 to 30% of the total piston travel of this upward stroke. So in the Miller cycle engine, the piston actually compresses the fuel-air mixture only during the latter 70% to 80% of the compression stroke. During the initial part of the compression stroke, the piston pushes part of the fuel-air mixture through the still-open intake valve, and back into the intake manifold.

Although efficiency is improved using the Miller cycle in reciprocating internal combustion engine systems as compared to the Otto-cycle engine, reciprocating internal combustion engines using the Miller cycle experience a reduction in the volumetric efficiency of the engine, which in turn leads to slow engine response with respect to load steps, as well as slow ramp up of the engine. In order to ensure the desired power output of the engine even under off nominal conditions and over the lifetime of the engine, a compressor bypass valve is used that introduces a reduction of efficiency, particularly at nominal, off nominal and transient operating conditions.

It would be advantageous to increase efficiency of the reciprocating internal combustion engine that uses the Miller cycle over a wider range of operating conditions.

BRIEF DESCRIPTION

In accordance with one embodiment disclosed herein, a reciprocating engine system comprises: a turbocharger system comprising a turbine driven compressor, an electrically driven compressor coupled to the mechanically driven compressor, a motor for driving the electrically driven compressor, and a compressor bypass valve; an engine block comprising engine cylinders for receiving gas from the turbocharger system; and a control system for controlling operation of the electrically driven compressor, the compressor bypass valve, and the engine block. The control system is programmed for generating control signals for: under nominal full load operating conditions, minimizing gas flow through the compressor bypass valve and compressing gas within the electrically driven compressor to maintain a speed set point or a full load power set point of the reciprocating engine system, under off nominal full load operating conditions wherein an efficiency of the mechanically driven compressor is reduced, compressing gas within the electrically driven compressor to compensate for the reduced efficiency of the mechanically driven compressor and to maintain the speed set point or the full load power set point of the reciprocating engine system, under partial load operating conditions, partially diverting the gas flow through the compressor bypass valve in response to the reduced load.

In accordance with another embodiment disclosed herein, a method is provided for operating a reciprocating engine system comprising a turbocharger system comprising a mechanically driven compressor, a turbine for driving the mechanically driven compressor, an electrically driven compressor coupled to the mechanically driven compressor, a motor for driving the electrically driven compressor, and a compressor bypass valve; and an engine block comprising engine cylinders for receiving gas from the turbocharger system. The method comprises: under nominal full load operating conditions, minimizing gas flow through the compressor bypass valve and compressing gas within the electrically driven compressor to maintain a speed set point or a full load power set point of the reciprocating engine system, under off nominal full load operating conditions wherein an efficiency of the mechanically driven compressor is reduced, compressing gas within the electrically driven compressor to compensate for the reduced efficiency of the mechanically driven compressor and to maintain the speed set point or the full load power set point of the reciprocating engine system, under partial load operating conditions, partially diverting the gas flow through the compressor bypass valve in response to the reduced load.

DRAWINGS

These and other features, aspects, and advantages of the present invention will become better understood when the following detailed description is read with reference to the accompanying drawings in which like characters represent like parts throughout the drawings, wherein.

Figure 13:
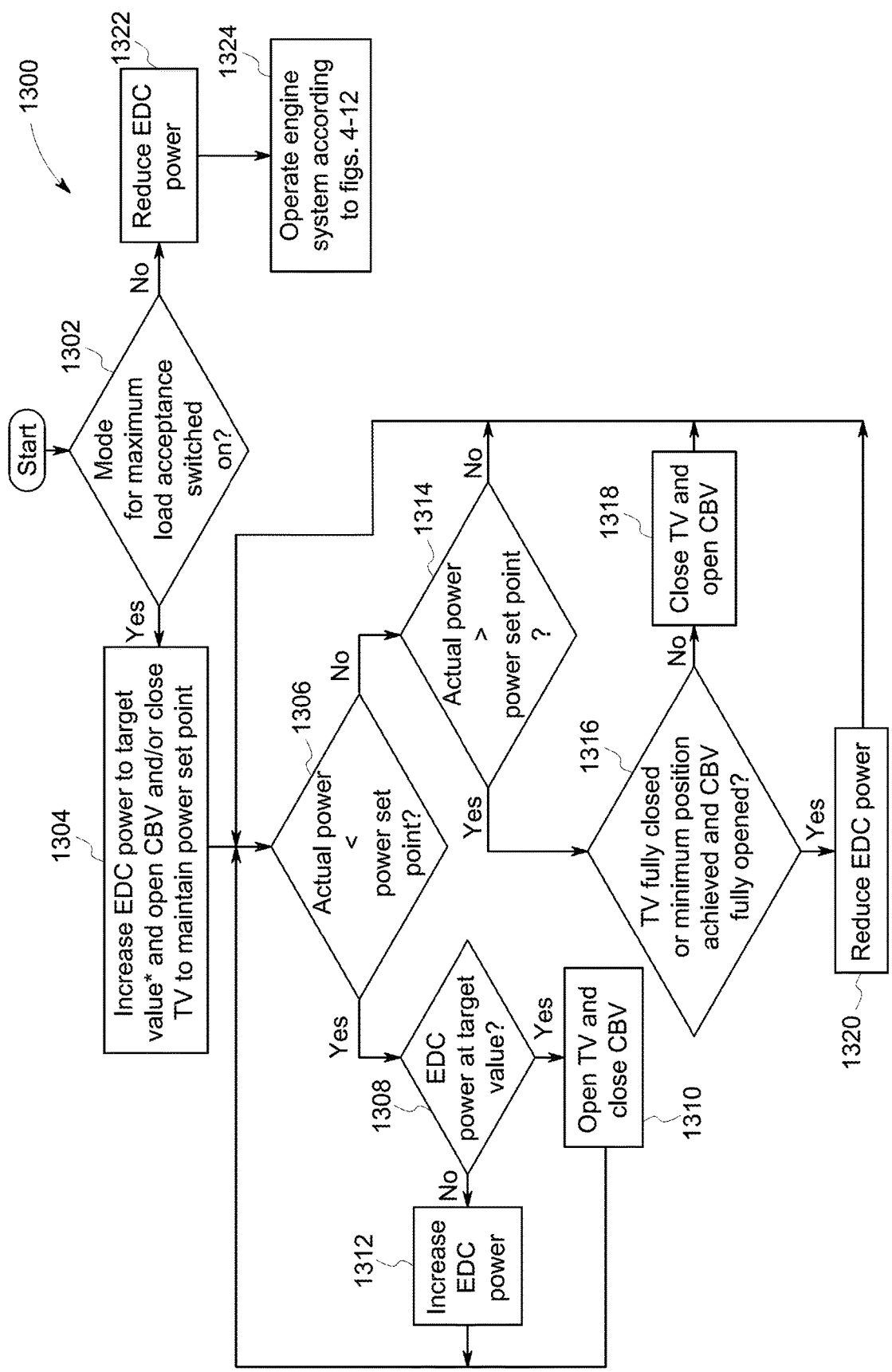
Figure 14:
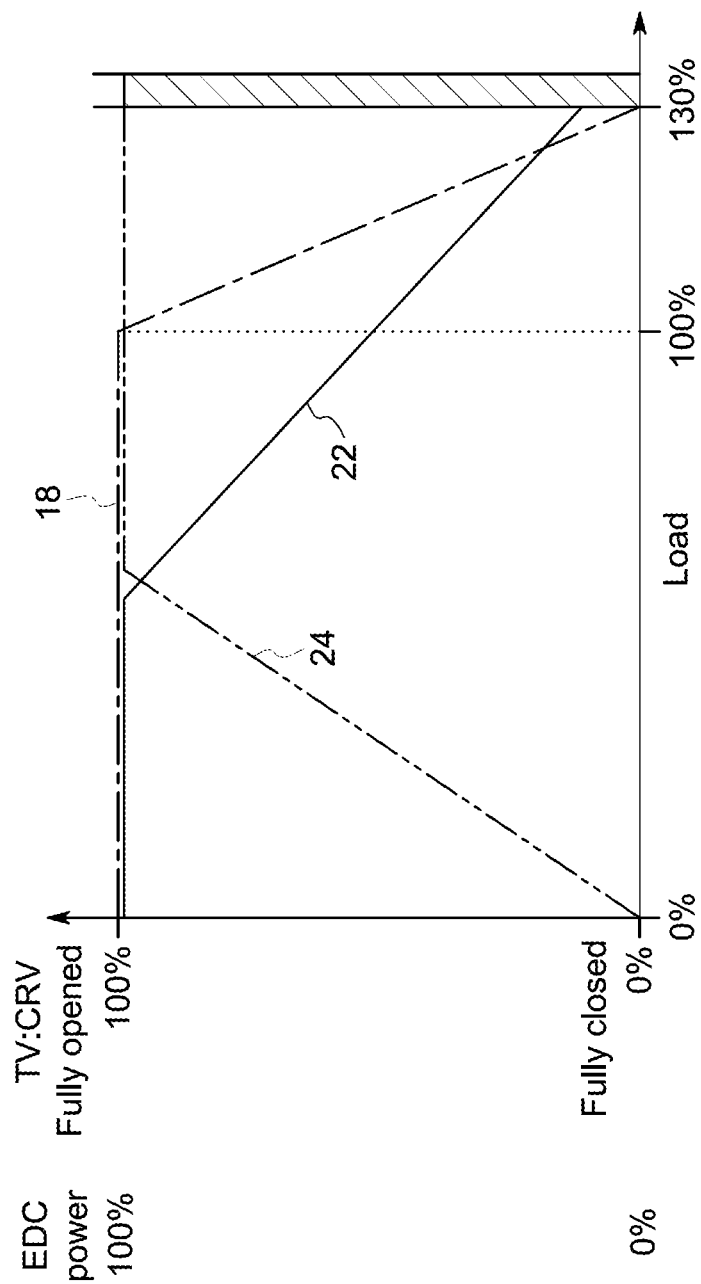

FIG. 13 is a flowchart of a method for controlling a reciprocating engine system under steady state operating conditions at maximum load acceptance conditions and nominal ambient operating condition in accordance with embodiments disclosed herein; and FIG. 14 is a graph of the control procedure for the process shown in FIG. 13 under maximum load acceptance mode at nominal ambient operating conditions.

DETAILED DESCRIPTION

Unless defined otherwise, technical and scientific terms used herein have the same meaning as is commonly understood by one of skill in the art to which this invention belongs. The terms "a" and "an" do not denote a limitation of quantity, but rather denote the presence of at least one of the referenced item. The use of "including," "comprising" or "having" and variations thereof herein are meant to encompass the items listed thereafter and equivalents thereof as well as additional items. The term "or" is meant to be inclusive and mean one, some, or all of the listed items. The terms "connected" and "coupled" are not restricted to physical or mechanical connections or couplings, and can include electrical or mechanical connections or couplings, whether direct or indirect. If ranges are disclosed, the endpoints of all ranges directed to the same component or property are inclusive and independently.

Figure 1:
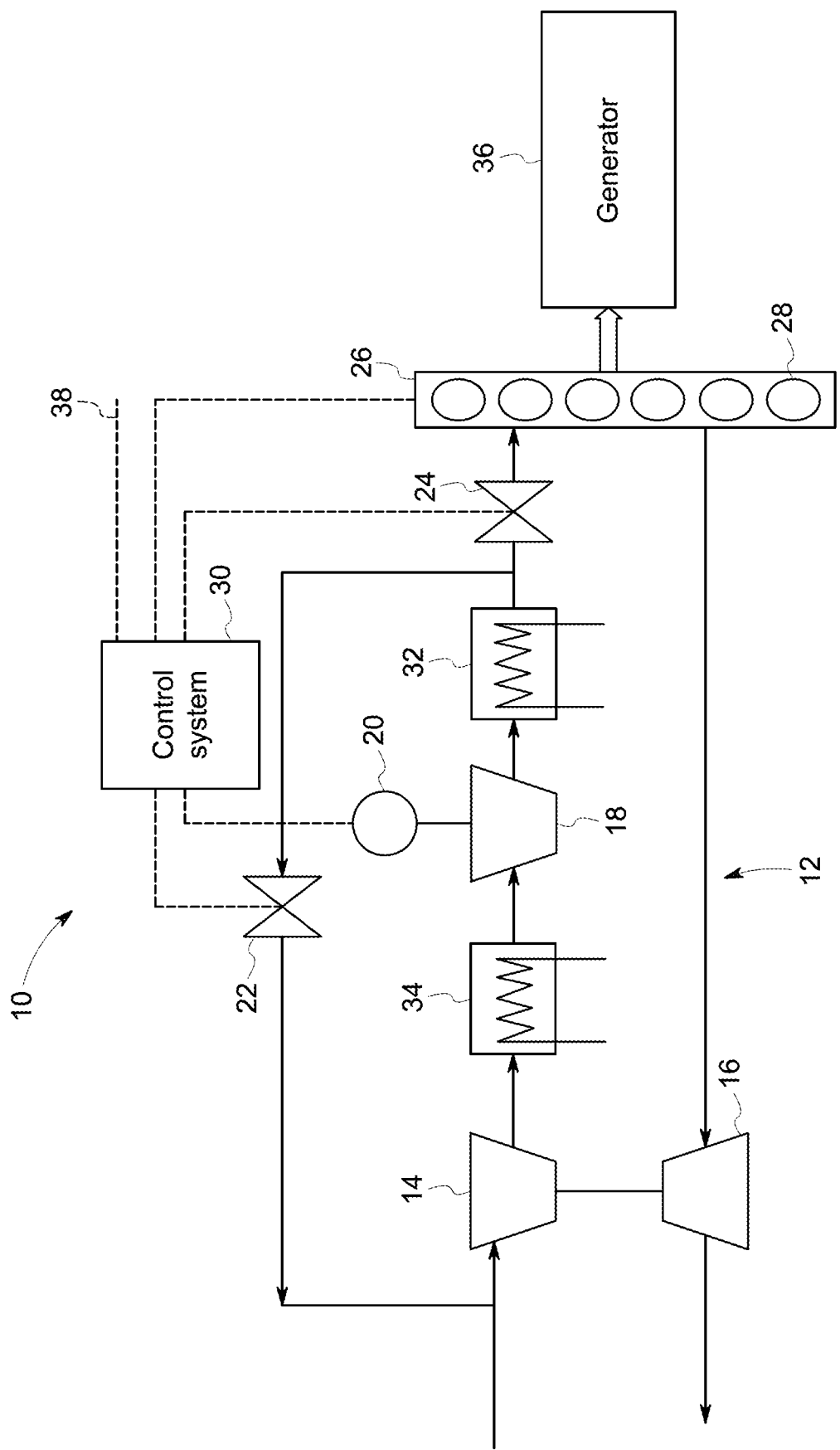
FIG. 1 is a block diagram of a reciprocating internal combustion engine system using a Miller cycle in accordance with an embodiment of the invention.

FIG. 1 is a block diagram of a reciprocating internal combustion engine system 10 using the Miller cycle according to an embodiment of the invention. The reciprocating engine system 10 comprises a turbocharger system 12, a throttle valve 24, an engine block 26, and a control system 30. Solid lines represent paths for gas, and dashed lines represent paths for commands and control signals.

The turbocharger system 12 comprises a turbine driven compressor 14 mechanically driven by a turbine 16, an electrically driven compressor 18 fluidly coupled to the turbine driven compressor 14, a motor 20 for driving the electrically driven compressor 18, a compressor bypass valve 22, and optional heat exchangers 32 and 34 on either side of electrically driven compressor 18 for cooling of the compressed gas.

Engine block 26 comprises engine cylinders 28 for receiving gas from turbocharger system 12. In the embodiment of FIG. 1, the exhaust gas from engine block 26 is supplied to turbine 16 which extracts mechanical energy for use in driving compressor 14. Typically, each engine cylinder 28 has a corresponding intake valve (not shown) for controlling the amount of gas from turbocharger system 12 that enters the respective engine cylinder 28. The gas that is compressed by the turbine driven compressor 14 and the electrically driven compressor 18 may accept gas in the form of either air or an air/fuel mixture. In some embodiments, the fuel is mixed with the air prior to reaching the turbine driven compressor 14 and the electrically driven compressor 18. In other embodiments, the air passes through the turbine driven compressor 14 and the electrically driven compressor 18, and the fuel is injected in the intake port, the region of the intake valve(s) of each respective engine cylinder 28.

Throttle valve 24 is coupled between turbocharger system 12 and engine block 26 and is primarily used in low load (low engine power) situations to reduce the filling of engine cylinders 28 below the filling that can be achieved when compressor bypass valve 22 is completely open.

FIG. 1 additionally illustrates a generator 36 for receiving mechanical power from engine block 26 and converting the mechanical power to electrical power for use by an electrical grid (not shown) or, in island (or "isolated") mode situations, a local load (not shown).

Control system 30 controls operation of electrically driven compressor 18, compressor bypass valve 22, throttle valve 24, and engine block 26 including fuel & Ignition system. Although one control system block is shown for ease of illustration, control system 30 may include either a single component or a plurality of components, which are either active and/or passive and are connected or otherwise coupled together to provide the described function. In one example, the control system may be implemented as software systems or computer instructions executable via one or more processor units (not shown) and stored in one or more memory units (not shown). A processor unit may comprise a device such as a workstation, personal computer (PC), laptop, notebook, tablet, or cell phone. Alternatively, or additionally, the control system may be implemented with one or more hardware systems such as, for example, via FPGAs, custom chips, integrated circuits (ICs), and/or PIDs.

As discussed in more detail with respect to FIG. 1, control system 30 may receive operator commands 38 and sensor signals (not shown) and may be programmed for generating various controls signals with the control signals of relevance to the present disclosure relating more specifically to control signals for: under nominal full load operating conditions, minimizing gas flow through compressor bypass valve 22 and compressing gas within electrically driven compressor 18 to maintain a speed set point or a full load power set point of reciprocating engine system 10, under off nominal full load operating conditions wherein the pressure level at the intake of an engine cylinder 28 of the engine block 26, provided by the turbine driven compressor 14 is not sufficient to provide the required gas mass flow through the engine, compressing gas within electrically driven compressor 18 to compensate for the reduced pressure of the turbine driven compressor 14 and to maintain the speed set point or (herein meaning either or both) the full load power set point of reciprocating engine system 10, and under partial load operating conditions, partially diverting the gas flow through compressor bypass valve 22 in response to the reduced load and adjusting the throttle valve if the opening of the bypass valve is not sufficient It will be appreciated that one turbine driven compressor 14 and one electrically driven compressor 18 are shown for purposes of illustration, and that the invention is not limited by the number of turbine driven compressors 14 and the number of electrically driven compressors 18. For example, multiple turbine and/or electrically driven compressors may be included. In the specific embodiment of FIG. 1, turbine driven compressor 14 is fluidly coupled in series with electrically driven compressor 18, and electrically driven compressor 18 is situated downstream of the turbine driven compressor 14. However, it will be appreciated that the invention is not limited by the relative location of the electrically driven compressor 18 with respect to the turbine driven compressor 14, and that the invention can be practiced with the electrically driven compressor 18 at any desired location. For example, the electrically driven compressor 18 can be located upstream of the turbine driven compressor 14.

Figure 2:
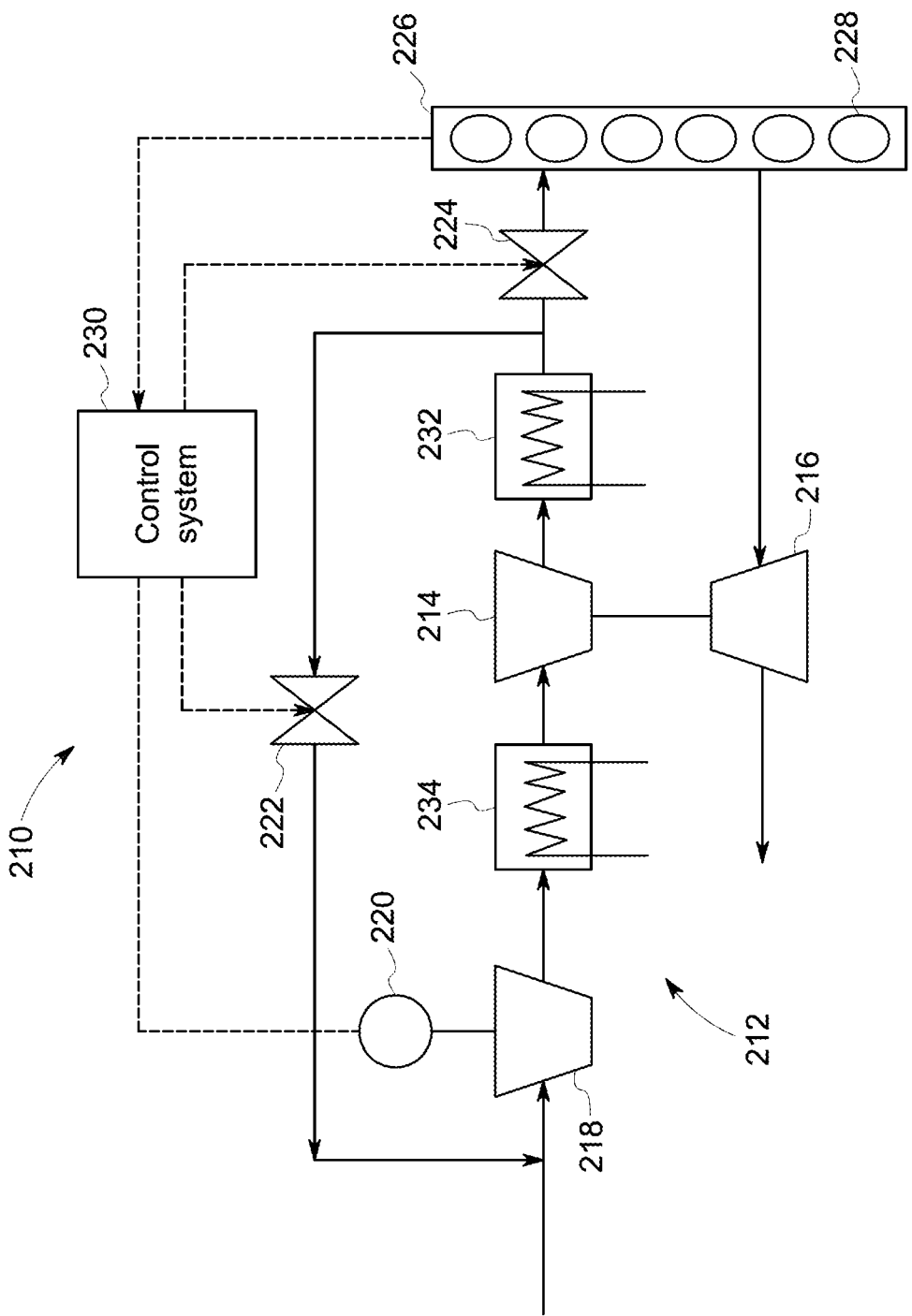
FIG. 2 is a block diagram of a reciprocating internal combustion engine system using the Miller cycle in accordance with another embodiment of the invention.

FIG. 2 is a block diagram of a reciprocating engine system 210 in accordance with another embodiment described herein wherein electrically driven compressor 218 (driven by motor 220) of turbocharger system 212 is situated upstream of the turbine driven compressor 214 (driven by turbine 216) and optional heat exchangers 232, 234, instead of downstream of the turbine driven compressor 14 of the embodiment of FIG. 1. It should be appreciated that the compressor bypass valve 222, the throttle valve 224, the engine block 226, the engine cylinders 228, and the control system 230 of FIG. 2 are functionally equivalent to the compressor bypass valve 22, the throttle valve 24, the engine block 26, the engine cylinders 28, and the control system 30, respectively, as discussed with respect to FIG. 1. The embodiment of FIG. 2 may be simpler when retrofitting existing reciprocating engine systems.

Figure 3:
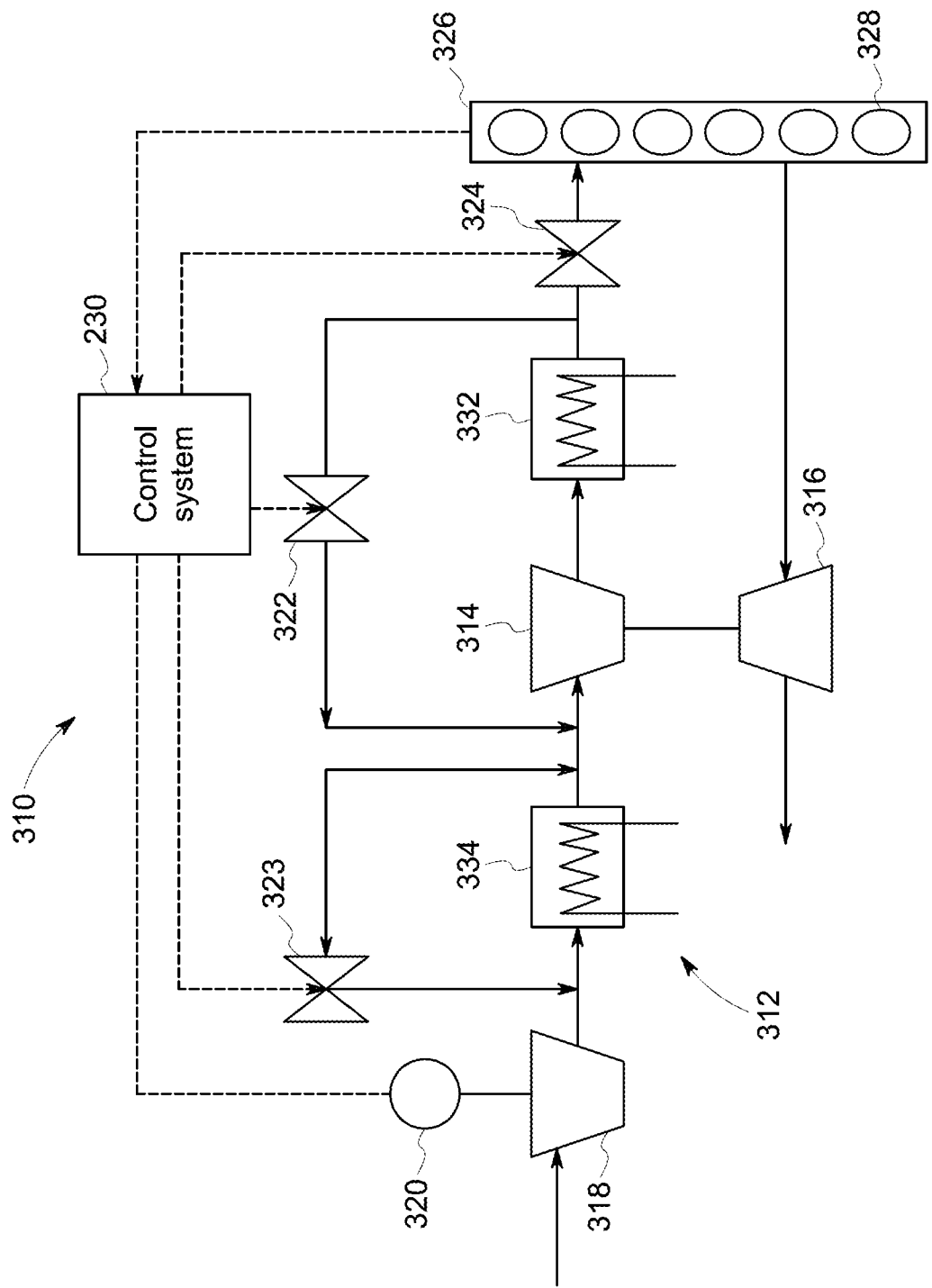
FIG. 3 is a block diagram of a reciprocating internal combustion engine system using the Miller cycle in accordance with another embodiment of the invention.

FIG. 3 is a block diagram of a reciprocating engine system 310 in accordance with another embodiment described herein wherein electrically driven compressor 318 (driven by motor 320) of turbocharger system 312 is situated upstream of mechanically driven compressor 314 (driven by turbine 316) and optional heat exchangers 332, 334, similar to the embodiment shown in FIG. 2. A difference between FIGS. 2 and 3 is that the embodiment of FIG. 3 includes two compressor bypass valves 322, 323 with compressor bypass valve 322 being coupled across turbine driven compressor 314 and compressor bypass valve 323 being coupled across electrically driven compressor 318. This embodiment provides more flexibility in bypassing electrically driven compressor 318 and allows to completely switch off the electrically driven compressor 318, but with a higher expense and complexity as compared to the embodiment of FIG. 2. It should be noted that the throttle valve 324, the engine block 226, the engine cylinders 228, and the control system 230 are functionally equivalent to the throttle valve 24, the engine block 26, the engine cylinders 28, and the control system 30, respectively, as discussed with respect to FIG. 1.

Figure 4:
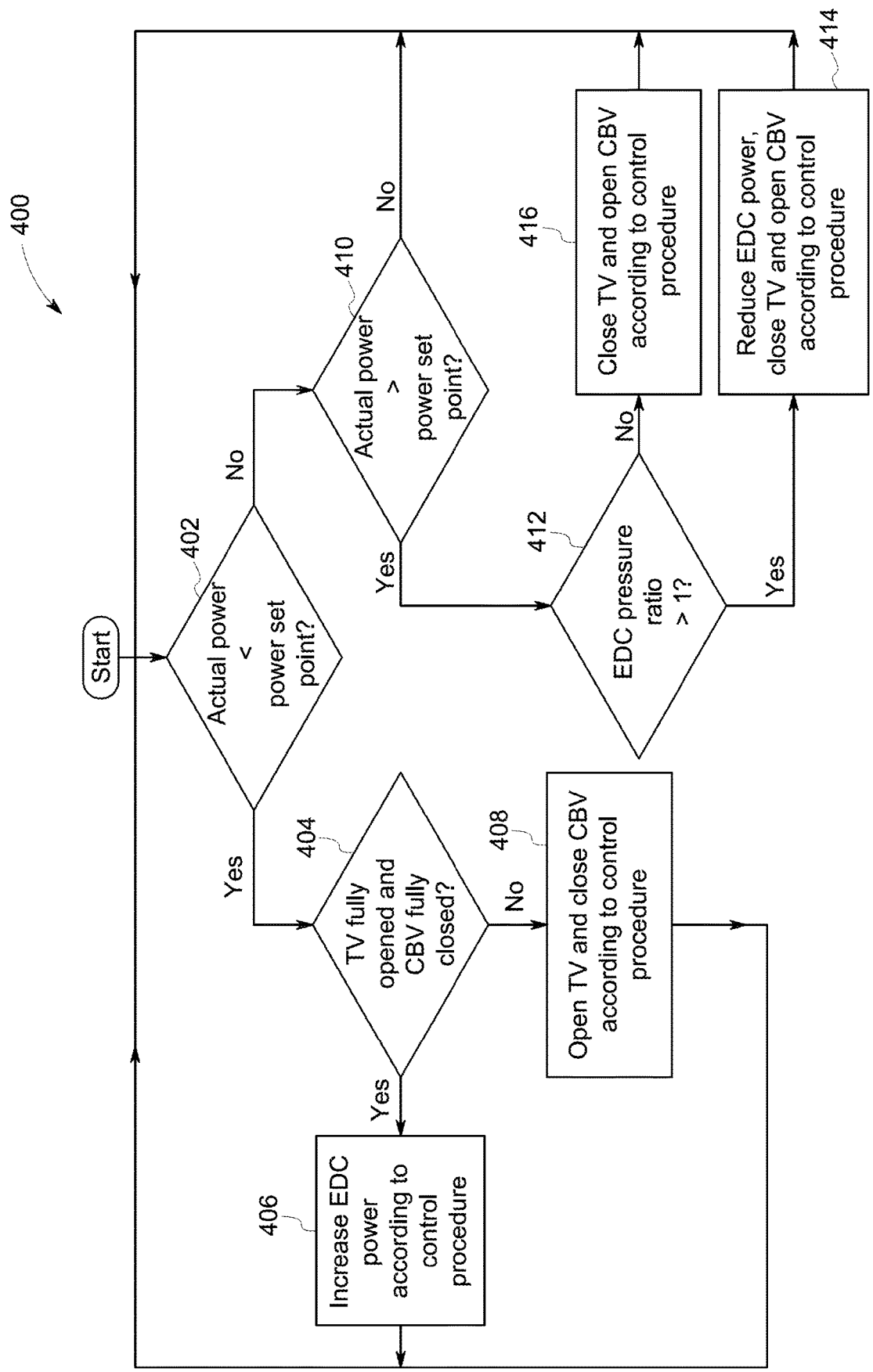
FIG. 4 is a flowchart of a method for controlling the reciprocating internal combustion engine systems shown in FIGS. 1-3 in steady state mode of operation at nominal ambient conditions according to the invention.

FIG. 4 is a flow chart of a method 400 for controlling a reciprocating engine system under steady state operating conditions at nominal ambient conditions in accordance with embodiments disclosed herein. For ease of illustration, the element numbers of FIG. 1 will be referenced when describing FIG. 4. In a grid connected mode, generally the reciprocating engine will have a speed set point (which typically is a constant rated crankshaft speed of engine block 26) and the utility may vary the required power set point that is demanded via operator command 38. In an island mode, there may not be a utility to send an operator command. Instead, the rated speed set point is targeted and, when the actual speed decreases, that decrease is an indication that more power is required. Control system 30 then operates reciprocating engine system 10 at increasing power levels until the required speed is again achieved or until a maximum power level is reached. Conversely in island mode, if the speed increases, then power levels may be decreased until the required speed is again achieved. As used herein "power set point" is intended to encompass both the utility command in the grid connected mode and the amount of power required to maintain a constant speed in the island mode. As one example, a PI (proportional integral) controller (not shown) may be used to control torque of electrically driven compressor 18. The torque may be calculated by the following equation:

$$M = K_p \cdot (P_{ref} - P_{act}) + \int K_i \cdot (P_{ref} - P_{act}) \cdot dt,$$

wherein M represents the torque command to be supplied to motor 20 for driving the electrically driven compressor 18, Pref represents the power command, Pact represents the measured actual power of reciprocating engine system 10, and Kp and Ki are PI controller constants.

As another example, the following equation may be used to calculate the torque command based on engine block speed:

$$M = K_p \cdot (n_{ref} - n_{act}) + \int K_i \cdot (n_{ref} - n_{act}) \cdot dt,$$

wherein n represents speed of the engine block in rpm.

Referring more specifically to FIG. 4, at step 402 it is determined whether the actual power of the reciprocating engine system is less than the power set point. In one embodiment, the control system 30 sends commands to motor 20 to cause electrically driven compressor 18 to compress the gas to maintain the speed set point or the full load power set point of reciprocating engine system 10. The speed and power set points may be fixed or variable (via commands 38, for example). Typically, reciprocating engine system 10 will be designed such that electrically driven compressor 18 will operate continually at some level to keep electrically driven compressor 18 functional and most ready to respond when needed. For example, during nominal full load operating conditions, electrically driven compressor 18 may operate at a baseline rate ranging from five percent to ten percent of maximum gas compression. The control system can receive operating signals from sensors (not shown) indicative of speed and power to determine whether the speed or power set point is being met, not being met, or being exceeded, and then command the motor to toggle compression accordingly by either slightly increasing or decreasing as needed.

When it is determined that the actual power of the reciprocating engine system 10 is less than the power set point at step 402, the process moves to step 404, wherein it is determined whether the throttle valve 24 is fully opened and the compressor bypass valve 22 is fully closed. If so, then the process moves to step 406, wherein the power of the electrically driven compressor 18 is increased according to control procedures, and the process returns to step 402. If not, then the process moves to step 408, wherein the throttle valve 24 is opened and the compressor bypass valve 22 is closed according to control procedures, and the process returns to step 402.

When it is determined that the actual power of the reciprocating engine system 10 is not less than the power set point at step 402, the process moves to step 410, wherein it is determined whether the actual power of the reciprocating engine system 10 is greater than the power set point. If so, then the process moves to step 412, wherein it is determined whether the pressure ratio of the electrically driven compressor 18 is greater than one. If so, then the process moves to step 414, wherein the power of the electrically driven compressor 18 is reduced, the throttle valve 24 is closed, and the compressor bypass valve 22 is opened according to control procedures. The process then returns to step 402. If at step 412 it is determined that the pressure ratio of the electrically driven compressor 18 is not greater than one, then the process moves to step 416, wherein the throttle valve 24 is closed and the compressor bypass valve 22 is opened according to control procedure, and the process returns to step 402.

Figure 5:
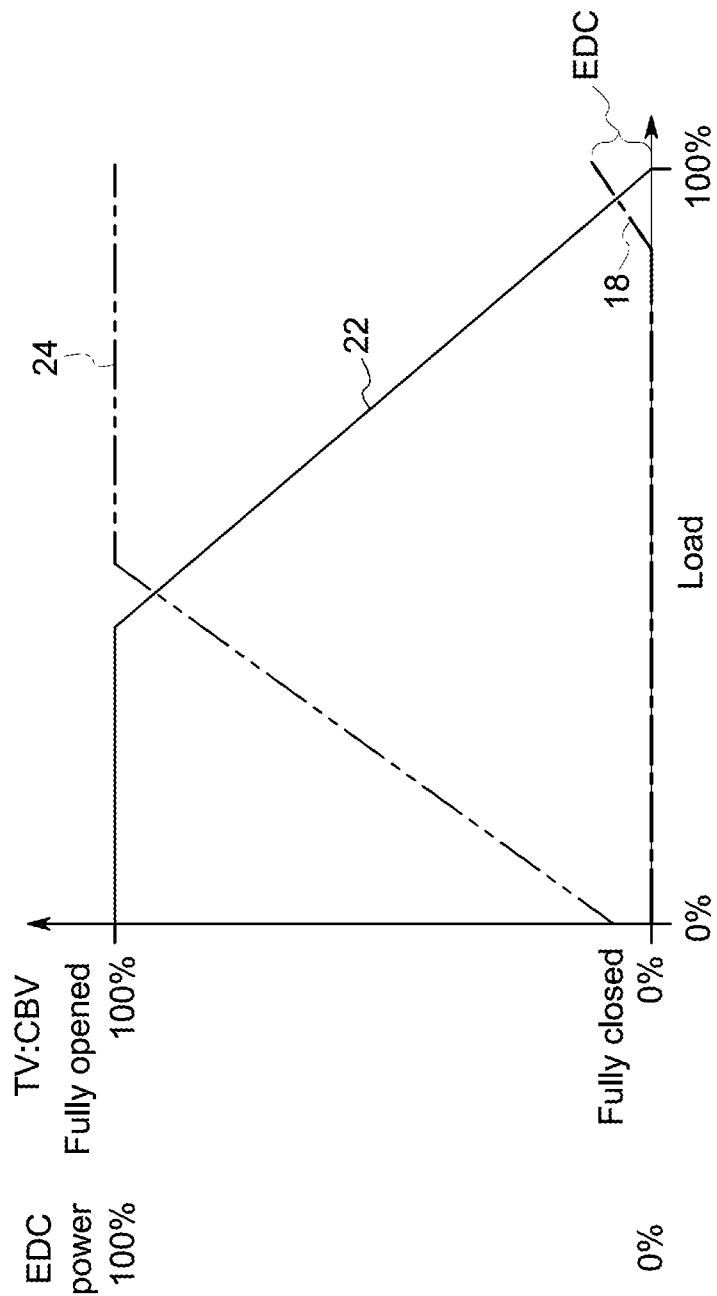
FIG. 5 is a graph showing the position of the compressor bypass valve and the throttle valve in a conventional reciprocating internal combustion engine system using the Miller cycle at nominal operating power conditions.

FIG. 5 is a graph illustrating the control procedure for the process described in FIG. 4 under steady state operating conditions at nominal ambient conditions with control using the electrically driven compressor 18. Under this control procedure, the compressor bypass valve 22 is fully open and the electrically driven compressor 18 is operating a 0% power, while the throttle valve 24 is slightly open at 0% load. As the load increases, the compressor bypass valve 22 begins to close between about 35% and 50% load, while the throttle valve 24 becomes fully open and the electrically driven compressor 18 remains at 0% power. As the load continues to increase, the electrically driven compressor 18 begins to produce power in the range between about 5% and 15%, and at 100% load (i.e. "full load"), the compressor bypass valve 22 is primarily fully closed.

As used herein, "primarily" with reference to closed means that compressor bypass valve 22 is opened by at most five percent. In more specific embodiment, compressor bypass valve 22 is opened by at most three percent. In a still more specific embodiment, compressor bypass valve 22 is opened by at most one percent. The reason for keeping some small amount of percentage open relates to practical considerations of valve functionality. In embodiments, wherein valves are able maintain functionality without any such opening, then such valves may be completely closed during nominal full load operating conditions. The power produced by the electrically driven compressor 18 provides a reserve for controlling the reciprocating engine system 10 for off nominal conditions, as well as for transient operating conditions.

As used herein, "full load" is defined as the standard operating load that the reciprocating engine system is designed to provide. As discussed above, this determination may be based on utility commands in a grid connected mode or upon a measurement of reciprocating engine block speed in an island mode.

Figure 6:
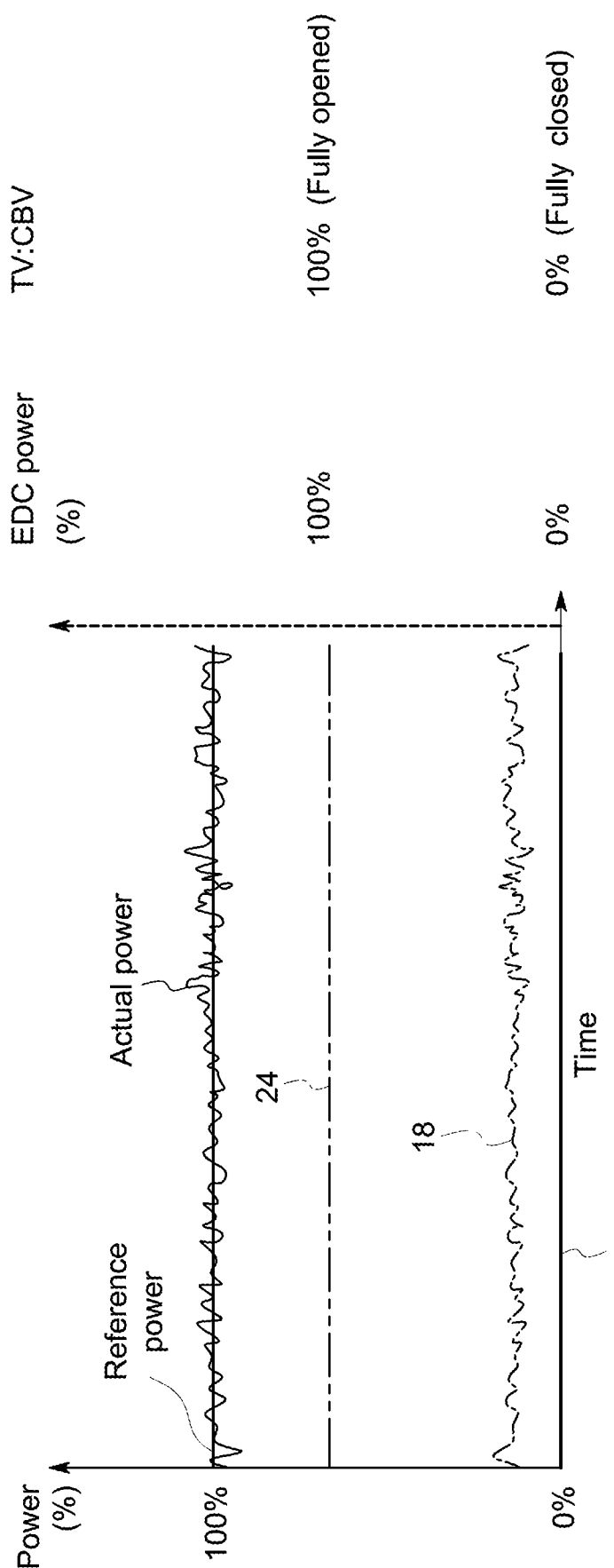
FIG. 6 is a graph of steady state operation of the reciprocating engine system at nominal operating conditions with power produced by the electrically driven compressor.

FIG. 6 illustrates a graph of steady state operation of the reciprocating engine system 10 at nominal operating conditions with power produced by the electrically driven compressor 18. As shown, the electrically driven compressor 18 produces power to maintain the reciprocating system 10 at 100% power, while the compressor bypass valve 22 is fully closed.

It should be noted that the process described in FIG. 4 can be implemented for steady state operation of the reciprocating engine system 10 at nominal operating conditions with control using the compressor bypass valve 22, instead of control using the electrically driven compressor 18.

Figure 7:
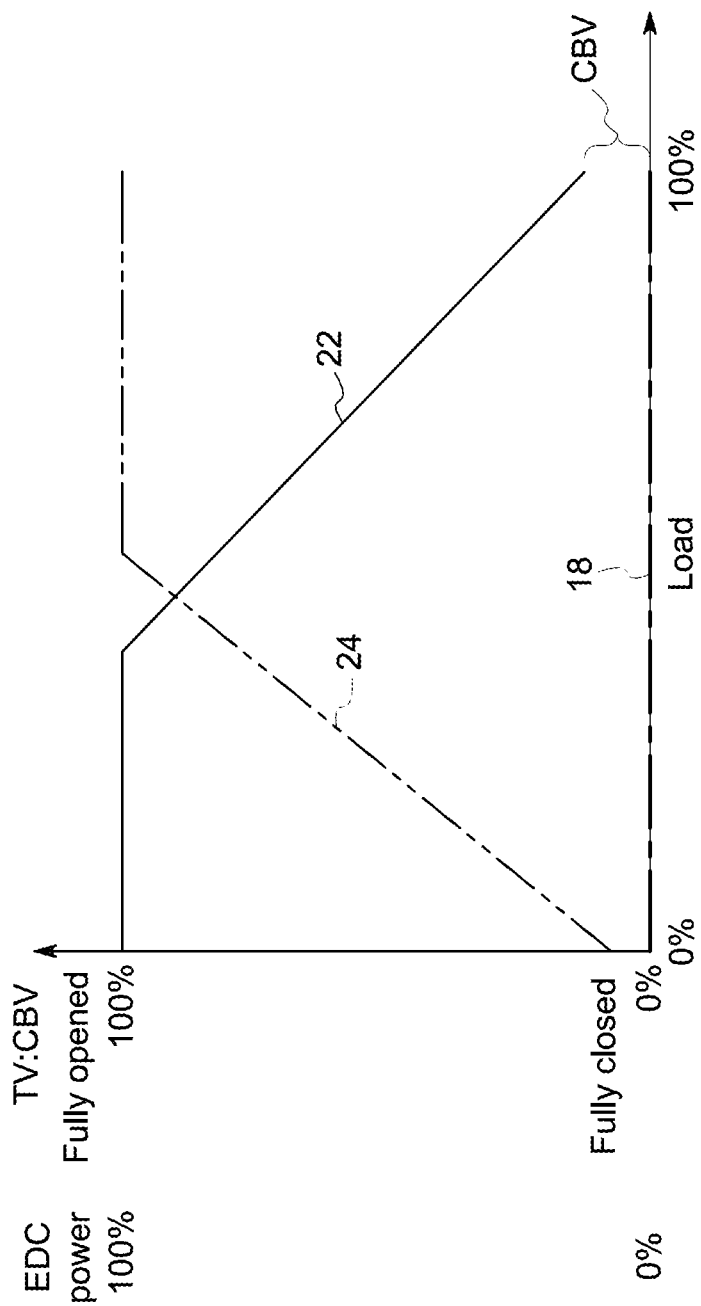
FIG. 7 is a graph of the control procedure for the process shown in FIG. 4 under steady state operating conditions at nominal ambient conditions with control using the compressor bypass valve, instead of control using the electrically driven compressor.

FIG. 7 is a graph illustrating the control procedure for the process described in FIG. 4 under steady state operating conditions at nominal ambient conditions with control using the compressor bypass valve 22, instead of control using the electrically driven compressor 18. Under this control procedure, the compressor bypass valve 22 is fully open and the electrically driven compressor 18 is operating a 0% power, while the throttle valve 24 is slightly open. As the load increases, the compressor bypass valve 22 begins to close between about 35% and 50% load, while the throttle valve 24 becomes fully open and the electrically driven compressor 18 remains at 0% power. As the load continues to increase to 100% load, the compressor bypass valve 22 is remains in a range between about 5% to 15% open, while the electrically driven compressor 18 remains at 0% power, to provide a reserve for controlling the reciprocating engine system 10 at steady state operating conditions. However, it should be noted that the electrically driven compressor 18 can provide support for the compressor bypass valve 22 to maintain the reciprocating engine system 10 at steady state operating conditions, if needed.

Figure 8:
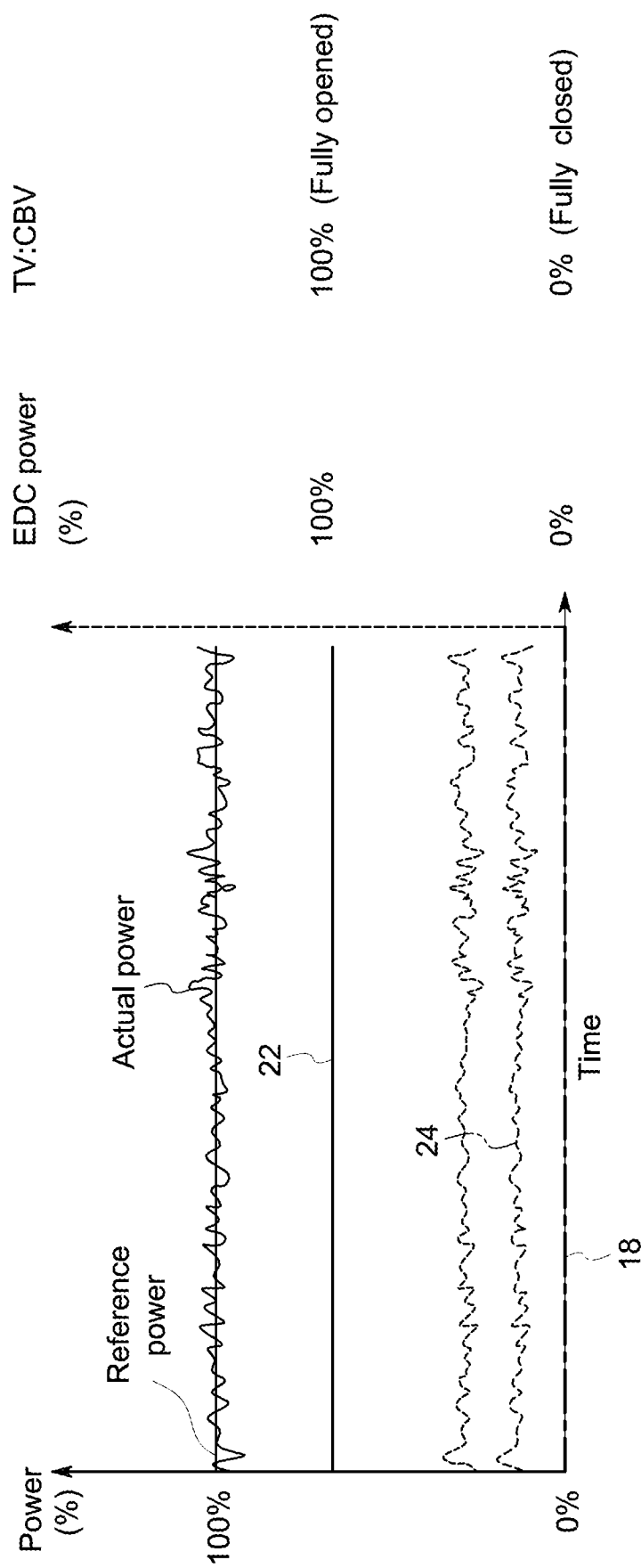
FIG. 8 is a graph of steady state operation of the reciprocating engine system at nominal operating conditions with control by the compressor bypass valve.

FIG. 8 illustrates a graph of steady state operation of the reciprocating engine system 10 at nominal operating conditions with control by the compressor bypass valve 22. As shown, the combination of the change of the valve timing of the Miller cycle and the use of electrically driven compressor 18 allows the compressor bypass valve 22 to maintain the reciprocating system 10 at 100% power at a lower percent open position, as compared to a conventional engine system that does not have support from the electrically driven compressor 18. For example, in conventional embodiments in which the compressor bypass valve bypasses about 10-20 percent of the gas during nominal operating conditions, the compressor bypass valve 24 of the invention is adjusted to bypass less during nominal operating conditions.

Figure 9:
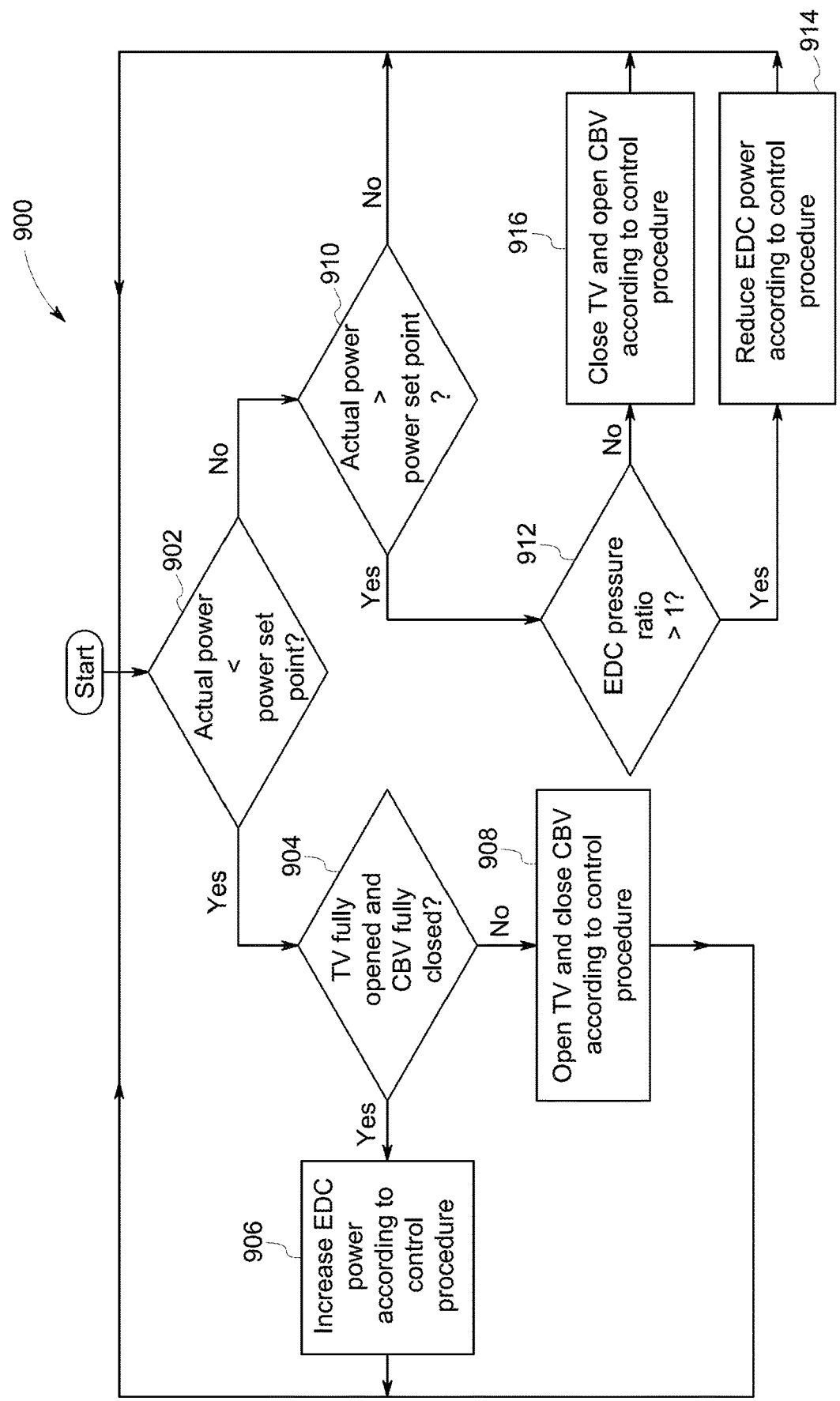
FIG. 9 is a flowchart of a method for controlling a reciprocating engine system under steady state operating conditions at off-nominal ambient conditions in accordance with embodiments disclosed herein.

FIG. 9 is a flow chart of a method 900 for controlling a reciprocating engine system under steady state operating conditions at off-nominal ambient conditions in accordance with embodiments disclosed herein. For ease of illustration, the element numbers of FIG. 1 will be referenced when describing FIG. 9. Ambient conditions are off-nominal when an efficiency of the mechanically driven compressor is reduced. For example, reduced efficiency may result from changes in ambient temperature, changes in ambient pressure, changes in altitude, or combinations thereof. As another example, efficiency may be reduced as components of the mechanically driven compressor age and become worn.

Referring more specifically to FIG. 9, at step 902 it is determined whether the actual power of the reciprocating engine system is less than the power set point. When it is determined that the actual power of the reciprocating engine system 10 is less than the power set point at step 902, the process moves to step 904, wherein it is determined whether the throttle valve 24 is fully opened and the compressor bypass valve 22 is fully closed. If so, then the process moves to step 906, wherein the power of the electrically driven compressor 18 is increased according to control procedures, and the process returns to step 902. If not, then the process moves to step 908, wherein the throttle valve 24 is opened and the compressor bypass valve 22 is closed according to control procedures, and the process returns to step 902.

When it is determined that the actual power of the reciprocating engine system 10 is not less than the power set point at step 902, the process moves to step 910, wherein it is determined whether the actual power of the reciprocating engine system 10 is greater than the power set point. If so, then the process moves to step 912, wherein it is determined whether the pressure ratio of the electrically driven compressor 18 is greater than one. If so, then the process moves to step 914, wherein the power of the electrically driven compressor 18 is reduced according to control procedures. The process then returns to step 902. If at step 912 it is determined that the pressure ratio of the electrically driven compressor 18 is not greater than one, then the process moves to step 916, wherein the throttle valve 24 is closed and the compressor bypass valve 22 is opened according to control procedure, and the process returns to step 902.

Figure 10:
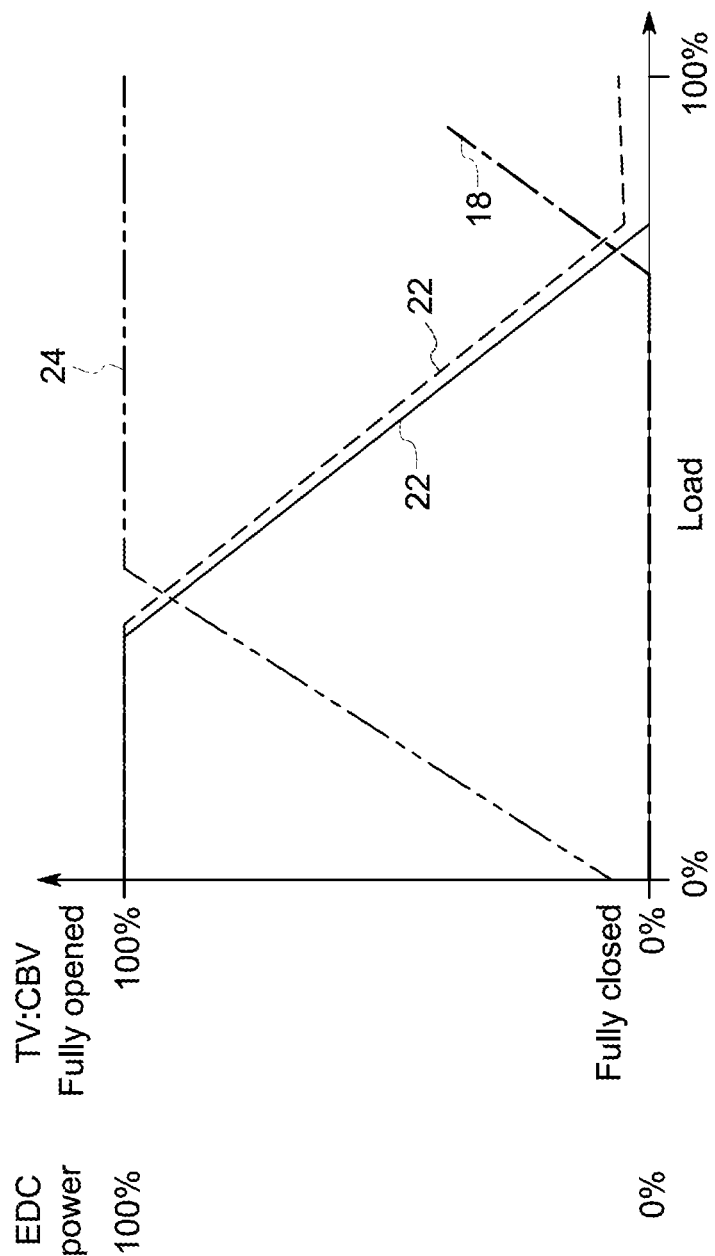
FIG. 10 is a graph of the control procedure for the process shown in FIG. 9 under steady state operating conditions at off-nominal ambient conditions with control using the electrically driven compressor.

FIG. 10 is a graph illustrating the control procedure for the process described in FIG. 9 under steady state operating conditions at off-nominal ambient conditions with control using the electrically driven compressor 18. Under this control procedure, the compressor bypass valve 22 is fully open and the electrically driven compressor 18 is operating a 0% power, while the throttle valve 24 is slightly open at 0% load. As the load increases, the compressor bypass valve 22 begins to close between about 35% and 50% load, while the throttle valve 24 becomes fully open and the electrically driven compressor 18 remains at 0% power. As the load continues to increase, the electrically driven compressor 18 begins to produce power in the range between about 35% and 45%, and at 100% load, the compressor bypass valve 22 is fully closed in accordance with the control procedure shown in FIG. 5. Alternatively, the compressor bypass valve 22 does not fully close in accordance with the control procedure shown in FIG. 7. It is noted that the reserve power produced by the electrically driven compressor 18 is larger in the off-nominal ambient condition shown in FIG. 10, as compared to the nominal ambient condition shown in FIG. 5.

Figure 11:
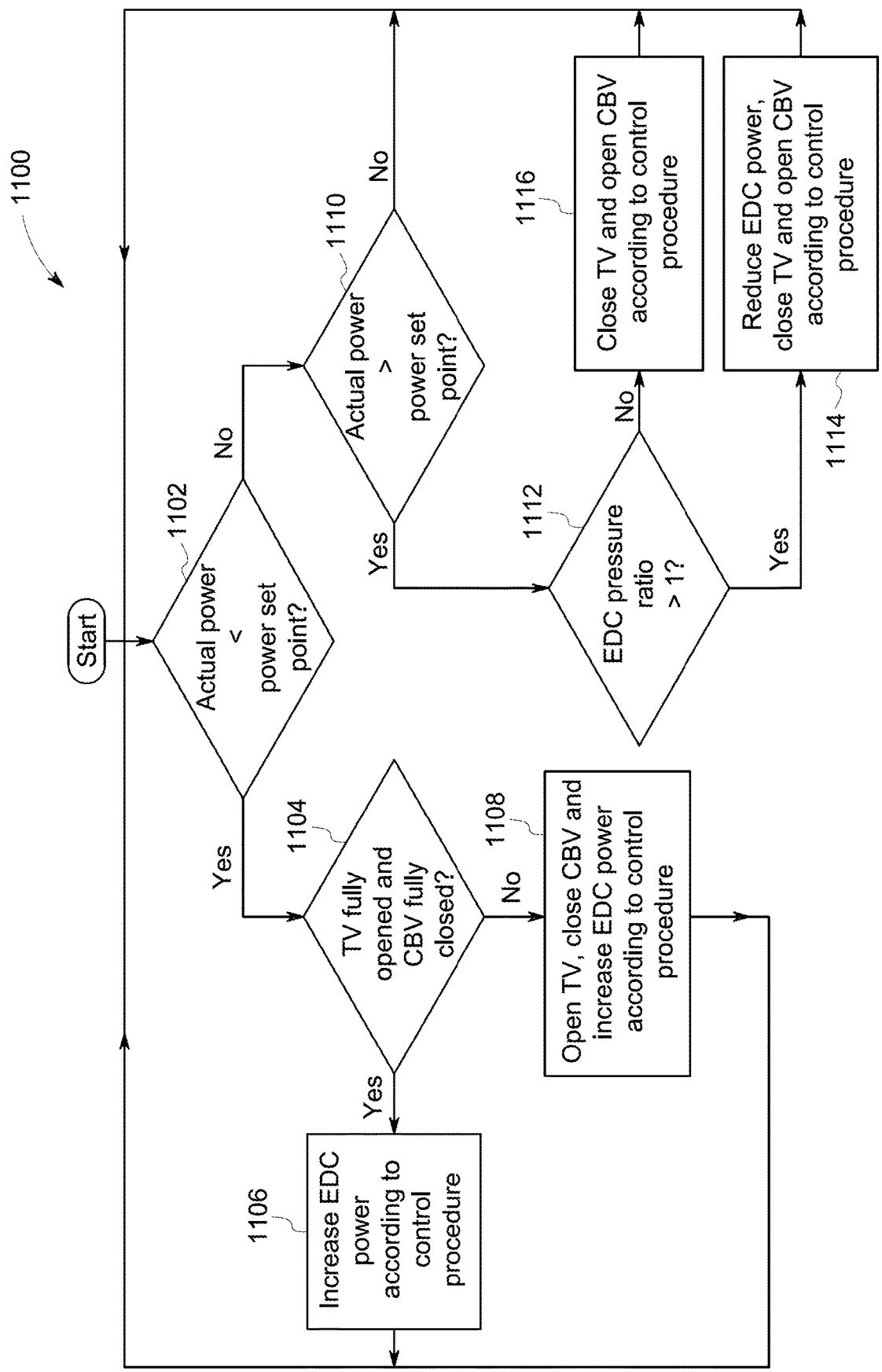
FIG. 11 is a flowchart of a method for controlling a reciprocating engine system under maximum power operating conditions in accordance with embodiments disclosed herein.

FIG. 11 is a flow chart of a method 900 for controlling a reciprocating engine system under maximum power operating conditions in accordance with embodiments disclosed herein. For ease of illustration, the element numbers of FIG. 1 will be referenced when describing FIG. 11.

Referring more specifically to FIG. 11, at step 1102 it is determined whether the actual power of the reciprocating engine system is less than the power set point. When it is determined that the actual power of the reciprocating engine system 10 is less than the power set point at step 1102, the process moves to step 1104, wherein it is determined whether the throttle valve 24 is fully opened and the compressor bypass valve 22 is fully closed. If so, then the process moves to step 1106, wherein the power of the electrically driven compressor 18 is increased according to control procedures, and the process returns to step 1102. If not, then the process moves to step 1108, wherein the throttle valve 24 is opened, the compressor bypass valve 22 is closed and power of the electrically driven compressor 18 is increased according to control procedures, and the process returns to step 1102.

When it is determined that the actual power of the reciprocating engine system 10 is not less than the power set point at step 1102, the process moves to step 1110, wherein it is determined whether the actual power of the reciprocating engine system 10 is greater than the power set point. If so, then the process moves to step 1112, wherein it is determined whether the pressure ratio of the electrically driven compressor 18 is greater than one. If so, then the process moves to step 1114, wherein the power of the electrically driven compressor 18 is reduced, the throttle valve 24 is closed and the compressor bypass valve 22 is opened according to control procedures. The process then returns to step 1102. If at step 1112 it is determined that the pressure ratio of the electrically driven compressor 18 is not greater than one, then the process moves to step 1116, wherein the throttle valve 24 is closed and the compressor bypass valve 22 is opened according to control procedure, and the process returns to step 1102.

Figure 12:
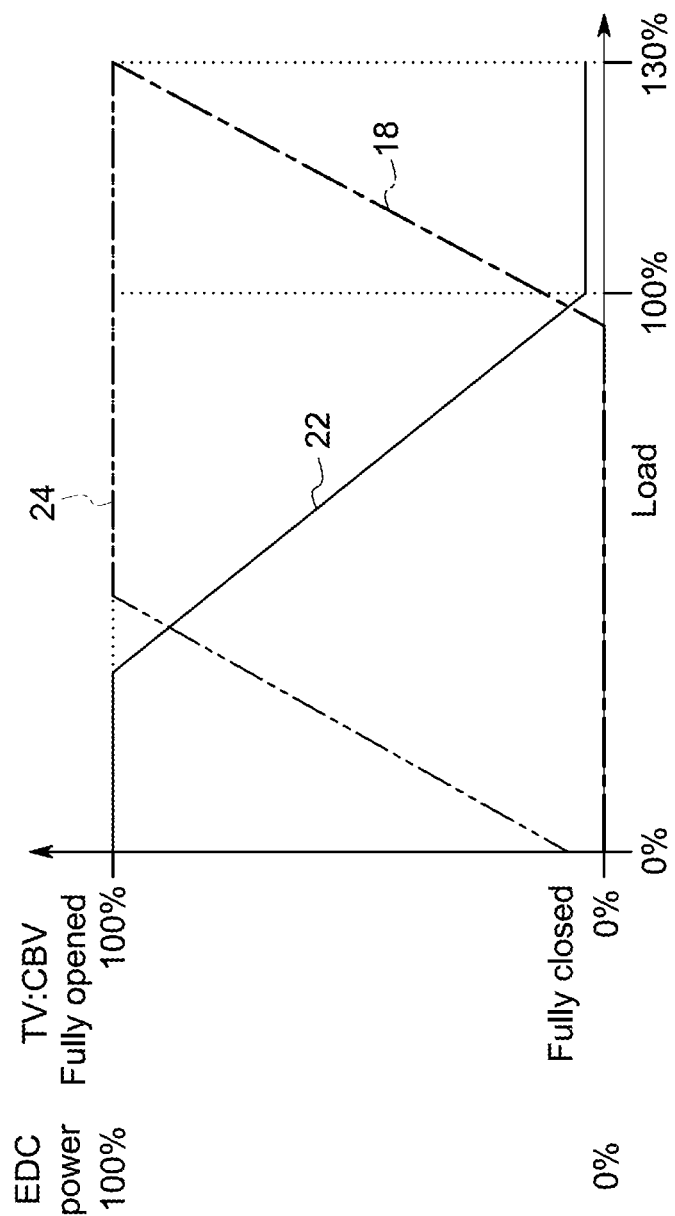
FIG. 12 is a graph of the control procedure for the process shown in FIG. 11 under maximum power operating conditions.

FIG. 12 is a graph illustrating the control procedure for the process described in FIG. 11 under maximum power operating conditions. Under this control procedure, the compressor bypass valve 22 is fully open and the electrically driven compressor 18 is operating a 0% power, while the throttle valve 24 is slightly open at 0% load. As the load increases, the compressor bypass valve 22 begins to close between about 25% and 50% load, while the throttle valve 24 becomes fully open and the electrically driven compressor 18 remains at 0% power. As the load continues to increase, the electrically driven compressor 18 begins to produce power in the range between about 35% and 45%, and at 100% load, the compressor bypass valve 22 is not fully closed in accordance with the control procedure shown in FIG. 7. As the load increases greater than 100%, the electrically driven compressor 18 increases in power to 100%, while the compressor bypass valve 22 remains slightly open, and the throttle valve 24 is fully open.

FIG. 13 is a flow chart of a method 1300 for controlling a reciprocating engine system under steady state operating conditions at maximum load acceptance conditions and nominal ambient operating condition in accordance with embodiments disclosed herein. For ease of illustration, the element numbers of FIG. 1 will be referenced when describing FIG. 13.

Referring more specifically to FIG. 13, at step 1302 it is determined whether the mode for maximum load acceptance is switched on. If so, the process moves to step 1304, wherein the power of the electrically driven compressor 18 is increased to a target value, which can be load dependent, and the compressor bypass valve 22 is opened and/or the throttle valve 24 is closed to maintain the power set point. Then, the process moves to step 1306, wherein it is determined whether the actual power of the reciprocating engine system 10 is less than the power set point. If so, then the process moves to step 1308, wherein it is determined whether the power of the electrically driven compressor 18 is at the target value. If so, then the process moves to step 1310, wherein the throttle valve 24 is fully opened and the compressor bypass valve 22 is fully closed, and the process returns to step 1306. If not, then the process moves to step 1312, wherein the power of the electrically driven compressor 18 is increased according to control procedures, and the process returns to step 1306. If at step 1306 it is determined that the actual power is greater than the power set point, then it is determined whether the actual power is greater than the power set point at step 1314. If not, then the process returns to step 1306. If so, then it is determined whether the throttle valve 24 is fully closed or the minimum position is achieved, and the compressor bypass valve 22 is fully opened at step 1316. If not, then the throttle valve 24 is closed and the compressor bypass valve 22 is opened at step 1318, and the process returns to step 1306. If the determination is made that the throttle valve 24 is fully closed or the minimum position is achieved, and the compressor bypass valve 22 is fully opened at step 1316, then the process moves to step 1320, wherein the power of the electrically driven compressor 18 is reduced according to control procedures, and the process returns to step 1306.

If at step 1302 it is determined that the mode for maximum load acceptance is not switched on, then the process moves to step 1322, wherein the power of the electrically driven compressor 18 is reduced according to control procedures, and the reciprocating engine system 10 is operated according to the control procedures in FIGS. 4-12 at step 1324.

FIG. 14 is a graph illustrating the control procedure for the process described in FIG. 13 under maximum load acceptance mode at nominal ambient operating conditions. Under this control procedure, the compressor bypass valve 22 is fully open and the electrically driven compressor 18 is operating a 100% power, while the throttle valve 24 is closed at 0% load. As the load increases, the compressor bypass valve 22 begins to close between about 35% and 50% load, while the throttle valve 24 becomes fully open. As the load increases greater than 100%, the electrically driven compressor 18 decreases in power to 0%, while the compressor bypass valve 22 remains slightly open, and the throttle valve 24 remains fully open. In the illustrated embodiment, the system 10 has a mechanical limit of 130% load. However, it will be appreciated that the invention is not limited by the mechanical limit of 130%, and that the invention can be practiced with any mechanical limit greater than 100% load.

It will be appreciated that the invention is not limited by the different operating conditions described above, and that the invention can be practiced with other operating conditions. For example, one type of transient operating condition is one in which the mechanically driven compressor 14 may be unable to supply enough compressed gas to reach the required power set point quickly enough in a situation such as a startup of the reciprocating engine system 10. In such a situation, gas may be compressed within the electrically driven compressor 18 to provide additional compressed gas to more quickly reach the required power set point. In one example of a startup mode, electrically driven compressor 18 is operated at its maximum power as soon as possible. As the power from mechanically driven compressor 14 increases to a level such that the maximum power from electrically driven compressor 18 is no longer needed, electrically driven compressor 18 may be ramped down towards its baseline power level.

Conversely, during a transient ramp down condition such as a shutdown, control system 30 may be programmed for generating control signals for, under such ramp down conditions, commanding motor 20 to reduce a pressure of the compressed gas from electrically driven compressor 18 and commanding compressor bypass valve 22 to open at a rate designed to avoid a pressure surge.

Thus, using embodiments of the present disclosure, increased efficiency is available under nominal operating conditions, increased control is provided of speed or power set points under various operating conditions, and reserve margin is provided during transient conditions without requiring the efficiency penalty that occurs in conventional compressor bypass embodiments.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A reciprocating engine system comprising:
a turbocharger system comprising a mechanically driven compressor, an electrically driven compressor coupled to the mechanically driven compressor, and a compressor bypass valve;
an engine block for receiving gas from the turbocharger system; and
a control system for controlling operation of the electrically driven compressor, the compressor bypass valve, and the engine block, the control system programmed for generating control signals for:
under nominal full load operating conditions, compressing the gas with the mechanically driven compressor, minimizing gas flow through the compressor bypass valve, and compressing the gas within the electrically driven compressor to maintain a speed set point or a full load power set point of the reciprocating engine system, wherein compressing the gas with the electrically driven compressor comprises operating the electrically driven compressor continually at least at a baseline level of compression and toggling the compression between increases and decreases in the compression,
under off nominal full load operating conditions, compressing the gas with the mechanically driven compressor at a reduced efficiency, and compressing the gas within the electrically driven compressor to compensate for the reduced efficiency of the mechanically driven compressor and to maintain the speed set point or the full load power set point of the reciprocating engine system,
under partial load operating conditions, partially diverting the gas flow through the compressor bypass valve in response to the reduced load.

2. The reciprocating engine system of claim 1, wherein the mechanically driven compressor is coupled in series with the electrically driven compressor, and the mechanically driven compressor is disposed upstream from the electrically driven compressor.

3. The reciprocating engine system of claim 1, wherein the control system is further programmed for generating control signals for, under nominal full load operating conditions, commanding the compressor bypass valve to be less than five percent open.

4. The reciprocating engine system of claim 1, wherein the baseline level of compression is between five percent and ten percent of maximum gas compression.

5. The reciprocating engine system of claim 1, wherein the control system is further programmed for generating control signals for, under nominal full load operating conditions, commanding the compressor bypass valve to be completely closed.

6. The reciprocating engine system of claim 1, wherein the off nominal full load operating conditions comprise changes in ambient temperature, changes in ambient pressure, changes in altitude, or combinations thereof.

7. The reciprocating engine system of claim 1, wherein the control system is further programmed for generating control signals for, under transient conditions wherein the mechanically driven compressor is unable to supply enough compressed gas to maintain a transient power set point or to reach the transient power set point quickly enough, compressing gas within the electrically driven compressor to provide additional compressed gas to maintain the transient power set point or to more quickly reach the transient power set point.

8. The reciprocating engine system of claim 1, wherein the control system is programmed for generating control signals for, under partial load operating conditions, further compressing gas within the electrically driven compressor to maintain the speed set point or a reduced load power set point of the reciprocating engine system.

9. The reciprocating engine system of claim 8, wherein the control system is further programmed for generating control signals for, under nominal full load operating conditions, commanding the engine block to operate under a Miller cycle, wherein the electrically driven compressor, in response to the controller, compresses the gas to increase efficiency of the reciprocating engine system to compensate for a reduction in a volumetric efficiency of the reciprocating engine system due to the Miller cycle.

10. A method of operating a reciprocating engine system comprising a turbocharger system comprising a mechanically driven compressor, an electrically driven compressor coupled to the mechanically driven compressor, and a compressor bypass valve, and an engine block for receiving gas from the turbocharger system, the method comprising:
   under nominal full load operating conditions, compressing the gas with the mechanically driven compressor, minimizing gas flow through the compressor bypass valve, and compressing the gas within the electrically driven compressor to maintain a speed set point or a full load power set point of the reciprocating engine system, wherein compressing the gas with the electrically driven compressor comprises operating the electrically driven compressor continually at least at a baseline level of compression and toggling the compression between increases and decreases in the compression,
   under off nominal full load operating conditions, compressing the gas with the mechanically driven compressor at a reduced efficiency, and compressing the gas within the electrically driven compressor to compensate for the reduced efficiency of the mechanically driven compressor and to maintain the speed set point or the full load power set point of the reciprocating engine system,
   under partial load operating conditions, partially diverting the gas flow through the compressor bypass valve in response to the reduced load.

11. The method of claim 10, further comprising, under partial load operating conditions, further compressing gas within the electrically driven compressor to maintain the speed set point or a reduced load power set point of the reciprocating engine system.

12. The method of claim 10, wherein the baseline level of compression is between five percent and ten percent of maximum gas compression.

13. The method of claim 10, wherein, under nominal full load operating conditions, minimizing gas flow through the compressor bypass valve comprises keeping the compressor bypass valve less than one percent open.

14. The method of claim 10, further comprising, under nominal full load operating conditions, operating the engine block under a Miller cycle.

15. The method of claim 10, wherein the off nominal full load operating conditions comprise changes in ambient temperature, changes in ambient pressure, changes in altitude, or combinations thereof.

16. The method of claim 10, further comprising, under transient conditions wherein the mechanically driven compressor is unable to supply enough compressed gas to maintain a transient power set point or to reach the transient power set point quickly enough, compressing gas within the electrically driven compressor to provide additional compressed gas to maintain the transient power set point or to more quickly reach the transient power set point.

17. A system, comprising:
   a controller configured to control operation of a reciprocating engine system comprising a an engine block that receives gas from a turbocharger system, wherein the turbocharger system comprises a mechanically driven compressor, an electrically driven compressor coupled to the mechanically driven compressor, and a compressor bypass valve, wherein the controller is programmed for generating control signals for:
   under nominal full load operating conditions, compressing the gas with the mechanically driven compressor, minimizing gas flow through the compressor bypass valve, and compressing the gas within the electrically driven compressor to maintain a speed set point or a full load power set point of the reciprocating engine system, wherein compressing the gas with the electrically driven compressor comprises operating the electrically driven compressor continually at least at a baseline level of compression and toggling the compression between increases and decreases in the compression,
   under off nominal full load operating conditions, compressing the gas with the mechanically driven compressor at a reduced efficiency, and compressing the gas within the electrically driven compressor to compensate for the reduced efficiency of the mechanically driven compressor and to maintain the speed set point or the full load power set point of the reciprocating engine system,
   under partial load operating conditions, partially diverting the gas flow through the compressor bypass valve in response to the reduced load.

18. The system of claim 17, comprising at least one of the engine block, the mechanically driven compressor, the electrically driven compressor, or the compressor bypass valve.

19. The system of claim 17, wherein the controller is programmed for generating control signals for, under partial load operating conditions, further compressing gas within the electrically driven compressor to maintain the speed set point or a reduced load power set point of the reciprocating engine system.

* * * * *